C. W. STANTON.
PROCESS OF DRYING CORN.
APPLICATION FILED MAY 22, 1913.
1,086,950.
Patented Feb. 10, 1914.
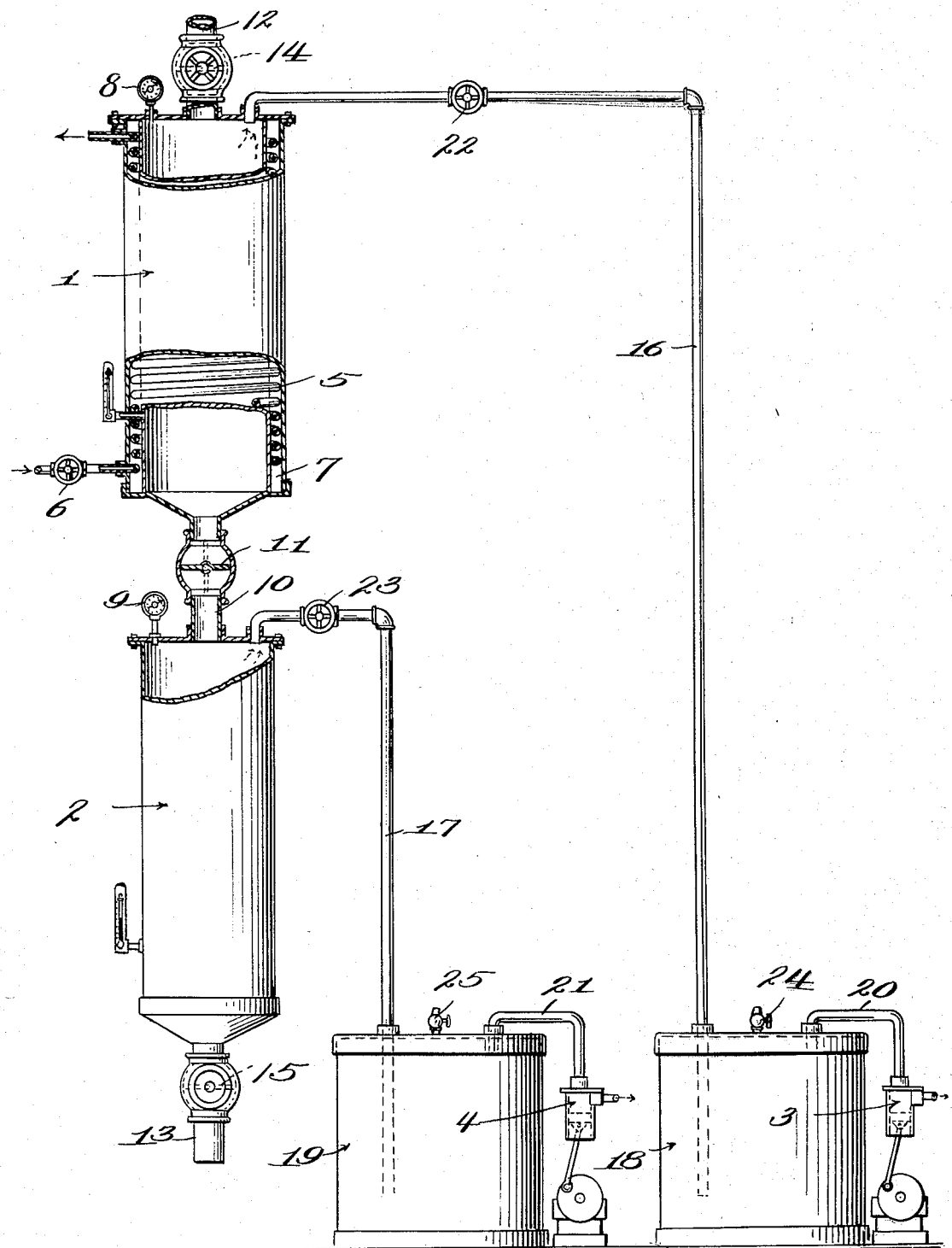
Witnesses:
Inventor
Charles W. Stanton
by
James L. Norris
Attorney

UNITED STATES PATENT OFFICE.

HERBERT MERTON, OF LONDON, ENGLAND.

WIRELESS RECEIVER.

1,095,342.

Specification of Letters Patent.

Patented May 5, 1914.

Application filed May 8, 1913. Serial No. 766,423.

*To all whom it may concern:*

Be it known that I, HERBERT MERTON, a subject of the King of England, residing at London, England, have invented certain new and useful Improvements in Wireless Receivers, of which the following is a specification.

This invention is for improvements in or relating to wireless telegraphy or telephony, its object being to enable a record to be taken of the messages received, such record being available whether or no the message be received by an operator as well as by the recorder. Messages are at present usually received by means of a telephone receiver at which the operator listens for dot-and-dash signals. If the operator is absent this method of receiving fails and in any case it leaves no record. On the other hand, the usual method of recording ordinary telegraphic messages, as on a tape, is not always sufficiently sensitive for wireless work.

It has heretofore been proposed to employ a phonographic record of audible wireless signals, obtained at a higher speed than could be orally received, to reproduce the signals at a sufficiently low speed to enable them to be orally interpreted, and I do not claim any such arrangement. It has also been proposed to deliver audible signals to a phonographic recorder by means of a telephone diaphragm set in vibration by the beats due to difference between the frequencies of the current in one coil mounted on the diaphragm and current in a second coil mounted near the first, and I do not claim any such arrangement.

According to the present invention I employ in combination with a wireless telegraph or telephone receiving apparatus, having an indicator giving audible signals, a current intensifier for the current in the indicator and a phonographic recorder adapted to receive and record the signals given by the indicator. Conveniently a relay of the type known in the art as a "Brown" relay is employed to intensify the current in the indicator. Since one of the chief objects of the present invention is to provide for those cases in which the operator is absent, the recording apparatus is preferably arranged to be automatically started, or both automatically started and stopped, and the device for producing this automatic action is operated electrically either by the signal-producing current or one derived therefrom; a current "derived from" the signal-producing current may be one controlled thereby through a sensitive relay. This stopping of the phonographic recorder may be arranged to set in motion an electric or clockwork apparatus which will give a reply signal to indicate that the phonographic recorder has been receiving.

By way of illustration and not by way of limitation one form of apparatus is hereinafter described with reference to the accompanying drawings in which—

Figure 1 is a diagrammatic representation of the circuits and apparatus, and Fig. 2 is an elevation of a portion of the apparatus.

A is a wire coming from the aerial to a tuning coil B to which a condenser C and detector D are connected in a manner well-known in the art. A battery F and potentiometer resistance H are provided, one end of the resistance being connected to the earth side of the detector D. A relay J of the Brown type, that is to say of the kind described in the British patent specification No. 11135 of 1908, granted to S. C. Brown, has one of its windings connected between one end of the exciting winding of a galvanometer G and a point between the condenser C and detector D. The other end of the exciting winding of the galvanometer G is connected to a variable point of the potentiometer resistance H so as to vary in the well-known manner the proportion of the voltage of the battery F available for operating the relay J and galvanometer G. The other circuit of the Brown relay is closed through the usual milliameter K', a telephone receiver K and a battery K². The horn of the telephone receiver is closely fitted to the horn L of a phonographic recorder so that the needle L' will produce recording marks on the drum M. The drum M is subjected to a constant driving force but is held in check, so that it cannot rotate, by a device under control from the galvanometer G in the manner hereinafter described. The galvanometer G is in fact a relay whose secondary circuit is closed through a battery G' and an electro-magnet indicated diagrammatically at O in Fig. 1 and more clearly shown at O in Fig. 2. On the end of the drum M are contact-rings M' with which engage brushes P so that the circuit from the battery G' is by way of one brush P and its slip-ring M', the coil O, the other slip-ring M' and its brush P, through the secondary contacts of the galvanometer G back to the battery G'.

Mounted on the end of the drum M is a pawl R pivoted at R' to a pillar carried by the drum and held by a spring $R^2$ in engagement with teeth S' on a circular boss S. The boss S is mounted loosely on the spindle $M^2$. The magnet O is carried on the end of the drum in such a position that the pawl R serves as its armature and when the magnet is excited the pawl is pulled against the action of the spring $R^2$ out of engagement with the teeth S'. The boss S carries a radially projecting arm $S^2$ which engages as shown with an arm T projecting from the bearing pedestal and when so engaged prevents further rotation of the cylinder. A light spring U has one end secured to the bearing pedestal and the other end secured to the boss S, the force of the spring being such as to tend constantly to throw the boss with its arm, around, upon the spindle $M^2$, in the opposite direction to that of the rotation of the drum.

In operation the driving gear of the recorder is wound up whereupon the drum will immediately run till the arm $S^2$ comes into the position shown in the drawings. If now a signal be received by the aerial, current will flow, not only through the main circuit of the Brown relay thereby causing current in the subsidiary circuit to produce a noise in the receiver K and a movement of the needle L', but current will also flow through the galvanometer G whose relay action will energize the magnet O and so draw the pawl R out of engagement with the boss S. The spring U thereupon immediately throws the arm $S^2$ around in a counter-clockwise direction, as viewed in Fig. 1, until it is brought against the bar T. This sets the phonograph drum free to revolve, and if nothing further happens the pawl R will have been returned by the spring $R^2$ into engagement with the teeth S' and the drum will revolve carrying with it the arm $S^2$ until stopped by reaching the position of the parts shown in the drawings. The drum will thus have made very nearly one complete revolution. Should, however, a further signal arrive while the said revolution is being performed the pawl will again be released, the arm $S^2$ will fly back so that one revolution of the drum will always occur after the last signal has been received. By this means the drum will continue revolving so long as successive signals are not spaced so far apart as to permit the drum to make one revolution between their occurrences.

The above-described apparatus may be variously modified in detail without departing from the spirit and scope of this invention. For example the drum may be arranged to stop after having completed a smaller fraction of a revolution than in the described construction or only after having completed a number of revolutions. In the former case the arm $S^2$ may play between two stops, for example two arms like the arm T; the construction to provide for a number of revolutions may be arrived at by interposing gearing between the drum and the stopping apparatus.

The arrangement of the receiving circuits, that is to say between the aerial and the telephone receiver, may be variously arranged according to well-known practice, that indicated being only one of a number of well-known arrangements with the exception only of the insertion and use of the galvanometer G.

It is essential that the sound produced by the indicator should be so concentrated in the receiver of the phonographic recorder that all the sounds are in fact recorded. The operator may be provided with a telephone or other indicator from which he receives the signals personally at the same time when they are being automatically recorded.

What I claim as my invention and desire to secure by Letters Patent is:—

1. The combination of an electrical wireless receiving apparatus having an indicator which gives audible signals, a current intensifier in the indicator circuit, a sound-recorder in such operative connection with the indicator as to receive the sounds emanating therefrom, a resiliently controlled member displaceably supported upon a guide and provided with stops to limit its travel in both directions and having operative connection with the sound-recorder whereby it is carried against the said resilient control toward one of the said stops and an electro-magnetically operated clutch having operative electrical connection with the indicator circuit to interrupt and restore the said operative connection between the displaceable member and the sound-recorder, substantially as set forth.

2. The combination of an electrical wireless receiving apparatus having an indicator which gives audible signals, a current intensifier in the indicator circuit, a sound-recorder in such operative connection with the indicator as to receive the sounds emanating therefrom and having a driving mechanism which tends constantly to rotate a rotatable member, and a rotatably mounted resiliently controlled arm having operative connection through a clutch with the said rotatable member and a fixed stop to check its travel in the direction of movement produced by the said resilient control and a fixed stop to limit its travel in the other direction and electro-magnetic means having operative electrical connection with the indicator circuit to operate the said clutch, substantially as set forth.

3. The combination of an electrical wireless receiving apparatus having an indicator which gives audible signals, a current intensifier in the indicator circuit, a recording phonograph having a rotatably mounted drum provided with slip-rings and brushes having operative electrical connection with the indicator circuit and carrying a detent which is controlled by an electro-magnet on the drum the said electro-magnet being connected to the slip-rings thereon and an arm rotatably mounted upon an axis in line with the axis of the said drum provided with serrations adapted to receive the said detent and with a spring which tends constantly to rotate it in a direction opposite to that of the phonograph drum and a fixed arm whose end projects into the circular path of the said rotatably mounted arm, substantially as set forth.

In testimony whereof I have signed my name to this specification in the presence of two subscribing witnesses.

HERBERT MERTON.

Witnesses:
ARTHUR ABBEY,
HAROLD H. SIMMONS.